Patented May 7, 1929.

1,711,710

UNITED STATES PATENT OFFICE.

HUGO WOLFF, OF MANNHEIM, GERMANY, ASSIGNOR TO GRASSELLI DYESTUFF CORPORATION, OF NEW YORK, N. Y., A CORPORATION OF DELAWARE.

VAT DYESTUFFS BY ACID CONDENSATION OF 2-BENZANTHRONYL-1-AMINO-ANTHRAQUINONES.

No Drawing. Application filed July 2, 1927, Serial No. 203,254, and in Germany July 1, 1926.

The condensation of 1-aminoanthraquinones with 2-halogenbenzanthrones results in the formation of compounds which may be termed 2-benzanthronyl-1-aminoanthraquinones.

I have now found that these substances, which are of low tinctorial value, on treatment with acid condensing agents, furnish new compounds of a distinct dyestuff character which produce fast dyeings on vegetable fibres from the vat.

The following examples will further illustrate how the said invention may be carried into practical effect but the invention is not limited to these examples. The parts are by weight.

Example 1.

10 parts of 2-benzanthronyl-1-aminoanthraquinone, (which may be obtained by heating 2-chlorbenzanthrone and 1-aminoanthraquinone in the presence of copper salts and acid-fixing agent in an organic solvent) and which corresponds to the formula

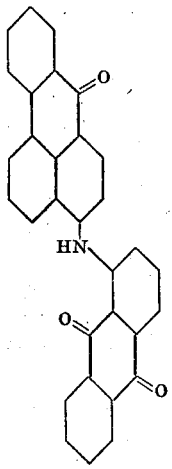

are heated to 125° C. with 100 parts of concentrated sulfuric acid and 2 parts of dry boric acid until the reaction is complete, the initially violet color of the melt changing quickly to a reddish brown. When the reaction is finished, the melt is poured into water, boiled up and filtered. The resulting dyestuff is red in the form of a paste, and reddish brown when dried. It dissolves to a reddish brown solution in concentrated sulfuric acid, and also dissolves but with difficulty, to a brownish yellow solution in hot organic solvents of high boiling point. With an alkaline hydrosulphite solution a red-brown hydrocompound is formed even in the cold, passing into solution, with a brown-red color, when gently warmed, but green at higher temperatures. Reddish-brown dyeings are obtained on vegetable fibres from both vats, the color changing to a brilliant orange red after washing and exposure to the air.

Example 2.

A mixture of 16 parts of anhydrous aluminium chlorid and 4 parts of common salt is intimately triturated with 2 parts of 2-benzanthronyl-1-aminoanthraquinone, then slowly heated to 100° C. in the oil bath and kept at that temperature for about half an hour. After cooling, the melt is decomposed with cold water and boiled up. The solution is filtered while hot, and the dyestuff recovered in the form of paste or in the dry state. It is identical with that described in Example 1.

Example 3.

10 parts of the condensation product obtainable by the condensation of 2.6-dichlorbenzanthrone, having a melting point of 230° C., with 2 molecules of 1-aminoanthraquinone in the manner described in Example 1 and corresponding to the formula

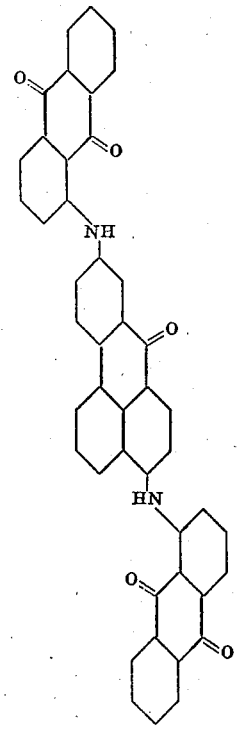

are heated to from 125° to 130° C. with 150 parts of concentrated sulfuric acid for about an hour. The melt is treated in the manner described in example 1. The resulting dyestuff is a brown powder which dissolves to an olive-brown solution in concentrated sulfuric acid, to olive-green in oleum of 23 per cent strength, and to green in sulfuric acid of 50° Bé. strength. With an alkaline hydrosulphite solution it furnishes a brown vat from which brown dyeings are obtained on vegetable fibres.

*Example 4.*

10 parts of 2-benzanthronyl-1-amino-6-chloranthraquinone, (which may be prepared from 2-chlorbenzanthrone and 1-amino-6-chloranthraquinone in the manner described in Example 1) and corresponding to the formula

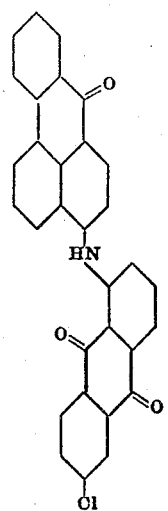

are heated as described in Example 1, with 100 parts of concentrated sulfuric acid until condensation is complete. The usual treatment furnishes a redish-brown paste, or when dried a dark brown powder, which dissolves to a red-brown solution in concentrated sulfuric acid, and to olive-green in 23 per cent oleum. Even in the cold, the dyestuff gives a red-brown vat with an alkaline hydrosulphite solution, the color changing to olive green when the solution is heated to about 70° C. Reddish-brown dyeings are obtained on vegetable fibres from both vats.

Example 5.

A mixture of 32 parts of anhydrous aluminium chlorid and 8 parts of common salt is heated at from 125° to 130° C. for about an hour with 5 parts of the condensation product obtainable from 1 molecule of 2-chlorbenzanthrone and 1 molecule of 1.6-diaminoanthraquinone in the manner described in Example 1 and corresponding to the formula.

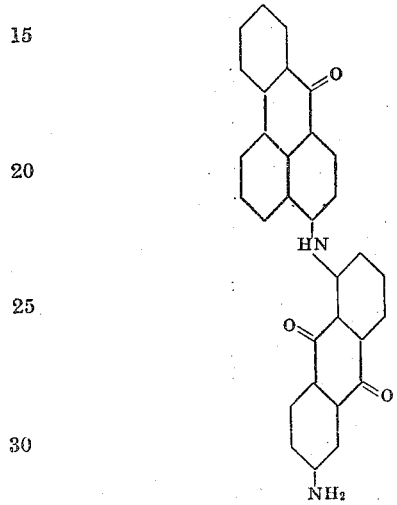

The melt is treated as described in Example 2, and furnishes the dyestuff in the form of a dark violet-brown paste, or dark brown powder, which dissolves to a reddish-brown solution in concentrated sulfuric acid or 23 per cent oleum, and to a violet-tinged red in sulfuric acid of 50° Bé. strength. With acetic anhydride, to which a few drops of concentrated sulfuric acid have been added, the dyestuff gives, on warming, an intensively carmine-red solution. Violet-brown dyeings are obtained on vegetable fibres from a red-brown vat.

Example 6.

10 parts of the condensation product obtainable by condensing 1 molecule of 2.6-dichlorbenzanthrone and 1 molecule of 1-amino-4-methoxyanthraquinone in the manner described in Example 1 and probably corresponding to the formula

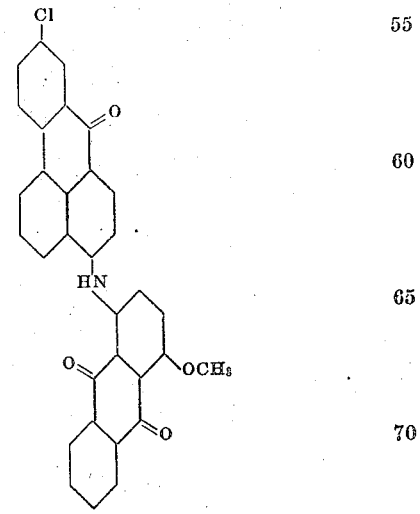

are heated with 100 parts of concentrated sulfuric acid, and worked up, in the manner specified in Example 3. The resulting dyestuff is in the form of a brown paste which gives, with an alkaline hydrosulphite solution, an olive-brown vat from which the fibre is dyed brown shades. The dyestuff dissolves to a reddish-brown solution in concentrated sulfuric acid, and to a brown solution in 23 per cent oleum.

What I claim is:

1. As new articles of manufacture, vat dyestuffs which form brown solutions in concentrated sulfuric acid, dye cotton from red-brown to olive-brown vats orange red to brown shades, and are obtainable by treating 2 - benzanthronyl - 1 - amino - anthraquinones with acid condensing agents.

2. The process of producing new vat dyestuffs which consists in treating 2-benzanthronyl-1-amino-anthraquinones with acid condensing agents.

In testimony whereof I have hereunto set my hand.

HUGO WOLFF.